(12) United States Patent
Abdul Jabbar

(10) Patent No.: US 11,417,903 B2
(45) Date of Patent: Aug. 16, 2022

(54) ELECTRODE-BASED REFORMER FOR SOLID OXIDE ELECTROCHEMICAL DEVICES

(71) Applicant: Nissan North America, Inc., Franklin, TN (US)

(72) Inventor: Mohammed Hussain Abdul Jabbar, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 240 days.

(21) Appl. No.: 16/699,229

(22) Filed: Nov. 29, 2019

(65) Prior Publication Data

US 2021/0167408 A1 Jun. 3, 2021

(51) Int. Cl.
*H01M 8/0637* (2016.01)
*H01M 8/0612* (2016.01)
*H01M 8/12* (2016.01)

(52) U.S. Cl.
CPC ....... *H01M 8/0637* (2013.01); *H01M 8/0618* (2013.01); *H01M 2008/1293* (2013.01); *Y02E 60/50* (2013.01)

(58) Field of Classification Search
CPC ............. H01M 8/0637; H01M 8/0618; H01M 2008/1293; Y02E 60/50
USPC ........................................................ 429/424
See application file for complete search history.

(56) References Cited

U.S. PATENT DOCUMENTS

| | | | |
|---|---|---|---|
| 4,365,007 A | 12/1982 | Maru et al. | |
| 2004/0101471 A1* | 5/2004 | Petch | C01B 3/382 423/652 |
| 2005/0076976 A1* | 4/2005 | Ide | C21D 8/0205 148/609 |
| 2005/0188618 A1* | 9/2005 | Kah | B01J 12/007 48/198.7 |
| 2007/0015015 A1 | 1/2007 | Hoshino et al. | |
| 2007/0231635 A1* | 10/2007 | Venkataraman | H01M 8/0612 429/410 |
| 2008/0261090 A1* | 10/2008 | Benito Gonzalez | C01B 3/326 429/401 |
| 2009/0061279 A1* | 3/2009 | Larsen | H01M 8/1226 429/410 |

(Continued)

FOREIGN PATENT DOCUMENTS

| | | |
|---|---|---|
| EP | 1408569 A2 | 4/2004 |
| WO | 2010/066460 A1 | 6/2010 |
| WO | 2011/159064 A2 | 12/2011 |

*Primary Examiner* — Jonathan G Jelsma
*Assistant Examiner* — Omar M Kekia
(74) *Attorney, Agent, or Firm* — Young Basile Hanlon & MacFarlane, P.C.

(57) ABSTRACT

An anode layer for a solid oxide electrochemical device comprises a metal support structure having an electrolyte-facing surface and a gas distribution-facing surface, the metal support structure defining pores having a pore diameter, anode catalyst supported within the metal support structure, channels formed within the gas distribution-facing surface of the metal support structure, and a first reformer catalyst deposited onto surfaces of the metal support structure defining the channels, the first reformer catalyst having a diameter greater than the pore diameter. The anode layer can further comprise a second reformer catalyst, with the first reformer catalyst reforming a first fuel and the second reformer catalyst reforming a second fuel.

20 Claims, 3 Drawing Sheets

(56) References Cited

U.S. PATENT DOCUMENTS

2012/0121999 A1\* 5/2012 Laurencin .......... H01M 4/8642
429/423

\* cited by examiner

ELECTRODE-BASED REFORMER FOR SOLID OXIDE ELECTROCHEMICAL DEVICES

TECHNICAL FIELD

This disclosure relates to electrode-based reformers for solid oxide electrochemical devices, and multi-functional electrode-based reformers for solid oxide electrochemical devices.

BACKGROUND

Solid oxide electrochemical devices can be used in various applications including as auxiliary power sources in vehicles. Many conventional solid oxide electrochemical devices operate at high temperatures, extending the start-up and cool-down time required.

Solid oxide electrochemical devices can operate with various fuels; however, to operate with non-hydrogen fuels e.g. hydrocarbons, ethanol, solid oxide electrochemical devices require a reformer to reform hydrocarbon fuels to produce hydrogen from the non-hydrogen fuels. External reformers require additional space and add additional cost. Attempts at internalizing the reformation by using catalyst to internally reform the non-hydrogen fuels adds internal resistance, reducing the power output, as reforming catalysts are poor electronic conductors.

SUMMARY

Disclosed herein are implementations of electrolyte structures and solid oxide electrochemical devices that incorporate the electrolyte structures.

One embodiment of an anode layer for a solid oxide electrochemical device comprises a metal support structure having an electrolyte-facing surface and a gas distribution-facing surface, the metal support structure defining pores having a pore diameter, anode catalyst supported within the metal support structure, channels formed within the gas distribution-facing surface of the metal support structure, and a first reformer catalyst deposited onto surfaces of the metal support structure defining the channels, the first reformer catalyst having a diameter greater than the pore diameter. The anode layer can further comprise a second reformer catalyst, with the first reformer catalyst reforming a first fuel and the second reformer catalyst reforming a second fuel.

An embodiment of a solid oxide electrochemical device disclosed herein comprises an anode layer, a cathode layer, and a solid electrolyte positioned between the anode and the cathode. The anode layer comprises an anode current collector and an anode. The anode comprises a metal support structure having an electrolyte-facing surface and a current collector-facing surface, the metal support structure defining pores having a pore diameter, anode catalyst supported within the metal support structure, channels formed within the current collector-facing surface of the metal support structure, and a first reformer catalyst deposited onto surfaces of the metal support structure defining the channels, the first reformer catalyst having a diameter greater than the pore diameter. The anode layer can further comprise a second reformer catalyst, with the first reformer catalyst reforming a first fuel and the second reformer catalyst reforming a second fuel.

Other embodiments and aspects are described herein and contemplated in the scope of the disclosure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Solid oxide electrochemical devices, such as solid oxide fuel cells (SOFCs), produce electricity directly from oxidizing a fuel such as hydrogen, methane, natural gas and ethanol. SOFCs are a class of solid oxide electrochemical devices characterized by the use of a solid oxide material as the electrolyte. SOFCs use a solid oxide electrolyte to conduct oxygen ions from the cathode to the anode. The electrochemical oxidation of hydrogen or carbon monoxide occurs on the anode side.

Solid oxide electrochemical devices include, but are not limited to, SOFCs, solid oxide electrolyzer cells, and all solid-state energy conversion and storage devices such as sensors and batteries. Solid oxide electrochemical devices have a wide variety of applications, from use as auxiliary power units in vehicles to stationary power generation. Some solid oxide electrochemical devices operate at average temperatures as high as 1000° C. These devices require start-up time to heat the device to operating temperature before obtaining the required performance. A slow start-up time is disadvantageous for use of the solid oxide electrochemical devices in automobiles. The high temperatures at which the solid oxide electrochemical devices operate deteriorate the devices due to, for example, differences in coefficients of thermal expansion between components, whether electrolyte-supported or electrode-supported.

Solid oxide electrochemical devices using non-hydrogen fuels such as methanol or ethanol require a reformer to convert the non-hydrogen fuel to hydrogen, often mixed with one or more of carbon monoxide, carbon dioxide and steam, for example, when steam reforming is used. Conventional external reformers take up valuable space when used in vehicles, for example, and add to the system cost. To minimize the system cost and footprint, on-anode internal reforming using catalyst is being developed. The on-anode internal reforming catalyst is usually a poor conductor of electricity, so the addition of the catalyst adds internal ohmic resistance and decreases the power output of the solid oxide electrochemical device.

Disclosed herein are solid oxide electrochemical devices that provide robust metal-supported electrodes with an inbuilt on-anode internal reforming layer to reform one or more non-hydrogen fuels. The devices herein will reduce the internal ohmic resistance caused by conventional on-anode reforming catalyst and will not compromise the power density while converting the complex hydrocarbons to reformed fuels such as hydrogen and carbon monoxide. The devices also improve heating and cooling times due to the support material used, improving start-up and cool-down times for applications in which a reduction in start-up and cool-down times is desired.

Figure 1:
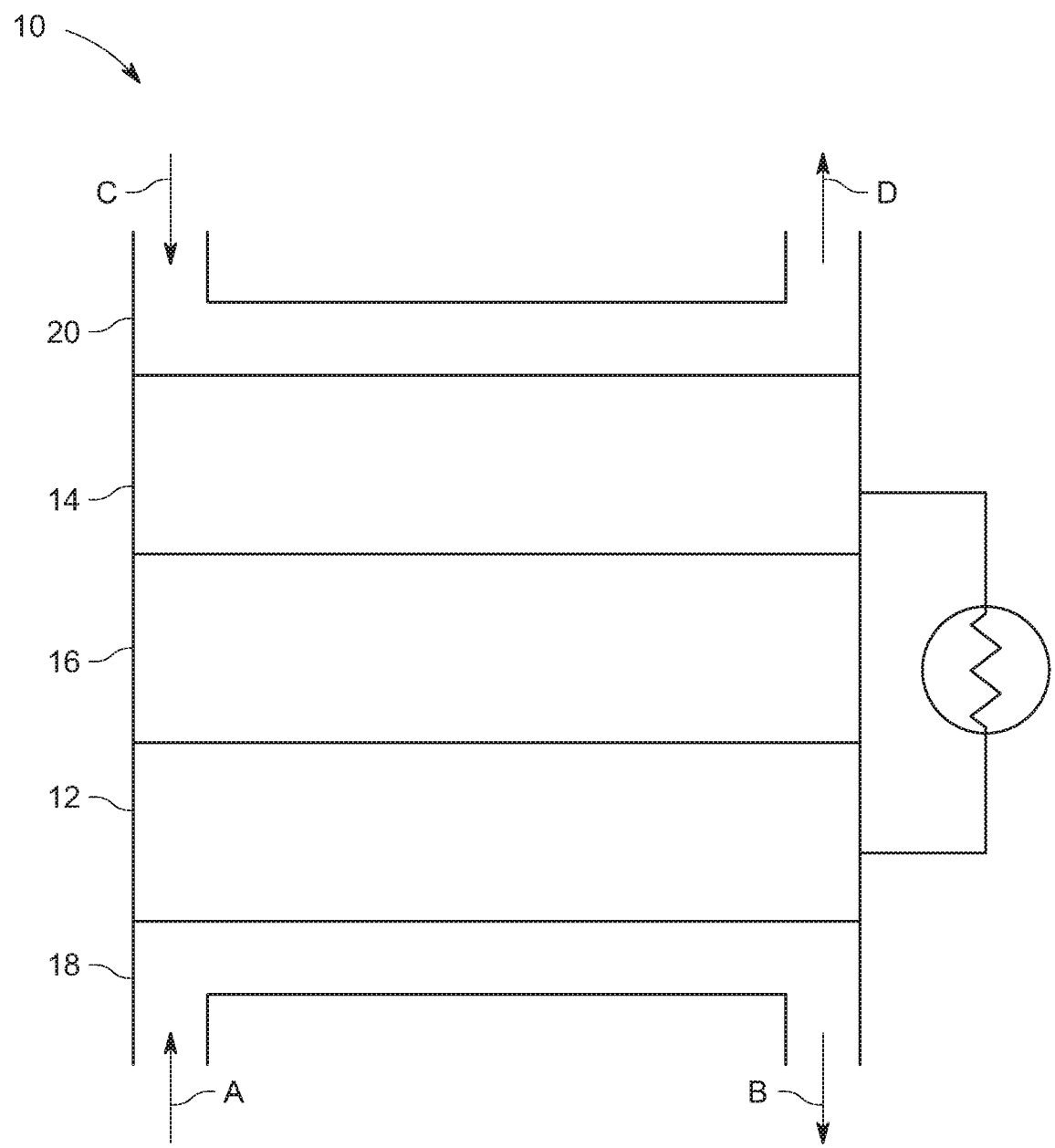
FIG. 1 is a perspective view of a unit cell of a solid oxide electrochemical device as disclosed herein.

An embodiment of a unit cell 10 of a solid oxide electrochemical device is illustrated in FIG. 1. The solid oxide electrochemical device unit cell 10 includes an anode layer 12, a cathode layer 14 and a solid electrolyte 16 between the anode layer 12 and the cathode layer 14. An anode interconnect 18 defines a fuel inlet A for fuel to enter the anode 12 and outlet B for excess fuel and water to exit. The anode interconnect 18 can define flow paths to distribute the fuel to the anode 12. A cathode interconnect 20 defines an oxidant inlet C to provide air or oxygen to the cathode 14 and outlet D for unused gas to exit. The cathode interconnect 20 can define flow paths to distribute the oxidant to the cathode 14.

Solid oxide electrochemical devices comprise multiple unit cells 10. In order to generate useful amounts of electrical power, unit cells 10 can be configured in a stack, as a non-limiting example, with multiple planar cells separated by the interconnect components that conduct electricity between the cells.

Figure 2:
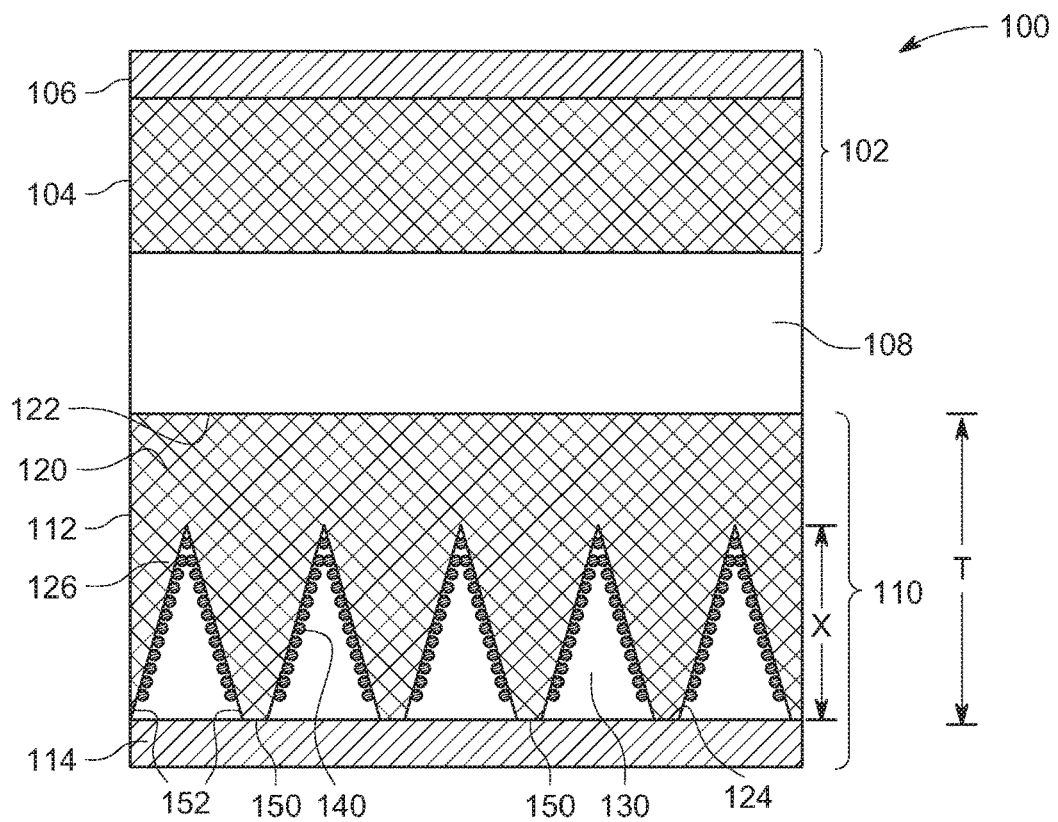
FIG. 2 is a cross-sectional schematic of a unit cell of a solid oxide electrochemical device having an embodiment of the anode layer as disclosed herein.

FIGS. 2-5 are cross-sectional views of a unit cell each illustrating an embodiment of the anode electrode as disclosed herein. FIG. 2 illustrates unit cell 100, which includes a cathode layer 102 having a cathode 104 and a cathode current collector 106, an electrolyte layer 108, and an anode layer 110 having an anode 112 and an anode current collector 114. In the exemplary planar stack design, the cathode current collector 106 is placed between the cathode interconnect 20 and the cathode 104, and the anode current collector 114 is placed between the anode interconnect 18 and the anode 112. The current collectors can be, as non-limiting examples, conductive foam or mesh. The current collectors can also assist in gas distribution through the electrodes.

The solid electrolyte layer 108 is a dense electrolyte that is sandwiched between the anode layer 110 and the cathode layer 102. The electrolyte is an oxide conducting electrolyte that can possess a fluorite structure or perovskite structure. The solid electrolyte can be one or more of a doped bismuth oxide, such as erbium-doped bismuth(III) oxide (Er-doped $Bi_2O_3$), scandia-cerium-zirconium oxides ($ScCeZrO_x$), yttria-stabilized zirconia (YSZ), scandia- and yttria-stabilized zirconia (ScYSZ), scandia-, cerium- and yttria-stabilized zirconia (ScCeYSZ), zirconium oxide doped with any combination of rare earth and/or alkaline earth elements, samarium-doped ceria (SDC), gadolinium-doped ceria (GDC), cerium oxide (ceria) doped with any combination of rare earth and/or alkaline earth elements, lanthanum strontium magnesium gallium oxide (LSGM), and other oxygen-ion-conducting ceramic electrolyte materials known to those skilled in the art. The electrolyte is very dense, being 98% dense or greater. The electrolyte layer 108 can be between about 7 μm and 10 μm in thickness.

The cathode catalyst can be, for example, cerium-zirconium mixed oxides ($CeZrO_{2-y}$) with transition metals or noble metals, lanthanum strontium manganite (LSM)-based perovskites, Sr-doped lanthanum ferrite (LSF) materials, Sr-doped lanthanum ferro-cobaltite (LSCF) materials, lanthanum strontium cobaltite (LSC), praseodymium oxide (PrOx), and neodymium oxide (NdOx). The cathode catalyst can be supported on a structure that can be metal or another material that provides a porosity of greater than 50% to allow for gas diffusion through the support. The cathode support structure can be the same material as the anode support structure. The cathode layer 102 can be between about 150 μm to 250 μm in thickness.

The anode layer 110 comprises a metal support structure 120 having an electrolyte-facing surface 122 and a gas distribution-facing surface 124. The metal support structure 120 defines pores 126 having a pore diameter D1. Anode catalyst is supported within the metal support structure 120. Channels 130 are formed within the gas distribution-facing surface 124 of the metal support structure 120. A reformer catalyst 140 is deposited onto surfaces of the metal support structure 120 defining the channels 130, and the reformer catalyst 140 has a diameter D2 greater than the pore diameter D1 so that the first reformer catalyst 140 sits on the surface of the metal support structure 120 and is not incorporated into the structure with the anode catalyst.

The anode metal support structure 120 is stainless steel and can be a mesh or other structure that provides both mechanical strength and porosity, such as a porosity of about 50% to 60%. The pore diameter D1 of the pores 126 of the metal support structure is less than or equal to 50 nm. The anode metal support structure 120 supports the anode catalyst while allowing for gas distribution through the anode 104. The anode catalyst can be, for example, nickel-based catalyst containing mixtures of cobalt and/or dopants of precious metals such as palladium, rhodium, and/or platinum, nickel-cerium oxide (Ni—CeOx), and cerium-zirconium mixed oxides ($CeZrO_{2-y}$) with transition metals or noble metals.

The channels 130 are formed into the gas distribution-facing surface 124 (or current collector-facing surface) of the anode metal support structure 120. The channels 130 can be V-shaped as illustrated, but this is a non-limiting example. The number of channels 30 is also only an example. The channels 130 increase the surface area of the gas distribution-facing surface 124 so that the reformer catalyst 140 can be provided on the surfaces of the metal support structure 120 that define the channels 130. The channels 130 also assist in directing the fuel that is fed to the anode layer 110 into the anode 112. The channels 130 can have a depth X that is between 40% and 70% of a total thickness T of the metal support structure 120. The total thickness T of the metal support structure 120, and thus the anode 112, can be between about 400 μm and 550 μm. As a non-limiting example, the total thickness T of the metal support structure 120 can be 500 μm, and the channels 130 can have a depth X of between 200 μm and 350 μm.

The reformer catalyst 140 is supported on the surfaces of the metal support structure 120 that define the channels 130. The reformer catalyst 140 can be spherical, tubular or fibrous in shape. The reformer catalyst 140 has a diameter D2 greater than the diameter D1 of the pores of the metal support structure 120 to prevent the reformer catalyst 140 from infiltrating the structure 120. The diameter D2 is greater than 50 nm. The reformer catalyst 140 can be deposited onto the surface defining the channels 130, forming a layer of the reformer catalyst 140 that is between about 15 μm and 25 μm in thickness. The reformer catalyst type depends on the type of fuel being reformed. As non-limiting examples, the reformer catalyst can be Ni☐$BaCe_{0.7}Zr_{0.1}Y_{0.2}O_{3-\delta}$ when the fuel is methane and can be Ru—Ni—Co/CZ or CeZrOx with multivalent ions such as Fe, Ni, Co and noble metals such as Pt, Ru, Rh, Pd, Ir, when the fuel is ethanol.

The anode current collector 114 is in contact with the metal support structure 120 at each peak 150 of the channels 130. The peak 150 is not necessarily a point and is simply the end of the metal support structure that defines the channels' mount. A reformer-free portion 152 is on each surface of each peak 150 between the anode current collector 114 and the reformer catalyst 140. The reformer-free portion 152 is a catalyst-free zone between the anode current collector 114 and the reformer catalyst 140 that provides a current collection path.

Figure 3:
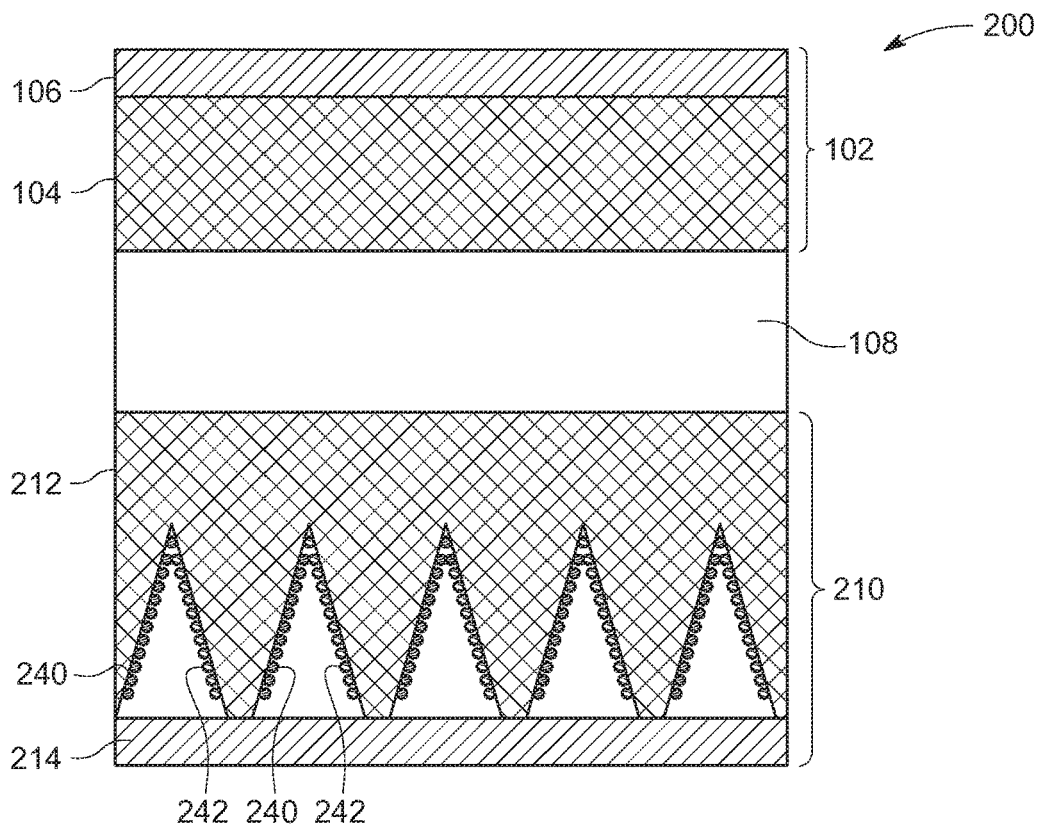
FIG. 3 is a cross-sectional schematic of a unit cell of a solid oxide electrochemical device having another embodiment of the anode layer as disclosed herein.

FIG. 3 illustrates unit cell 200, which has the same structural layers as those in the unit cell 100 in FIG. 2, with aspects of the anode layer 210 as further described. Unit cell 200 includes a cathode layer 102 having a cathode 104 and a cathode current collector 106, an electrolyte layer 108, and an anode layer 210 having an anode 212 and an anode current collector 214. The anode layer 210 is the same as that described with respect to anode layer 110, except the anode 212 includes a first reformer catalyst 240 and a second reformer catalyst 242 different than the first reformer catalyst 240. The first reformer catalyst 240 reforms a different fuel than the second reformer catalyst 242. As a non-limiting example, the first reformer catalyst 240 may be Ni☐BaCe$_{0.7}$Zr$_{0.1}$Y$_{0.2}$O$_{3-\delta}$ to reform methane and the second reformer catalyst 242 may be Ru—Ni—Co/CZ to reform ethanol. In FIG. 3, the first reformer catalyst 240 is deposited onto one side of the metal support structure 120 defining each channel 130 and the second reformer catalyst 242 is deposited onto an opposite side of the metal support structure 120 defining each channel 130.

Figure 4:
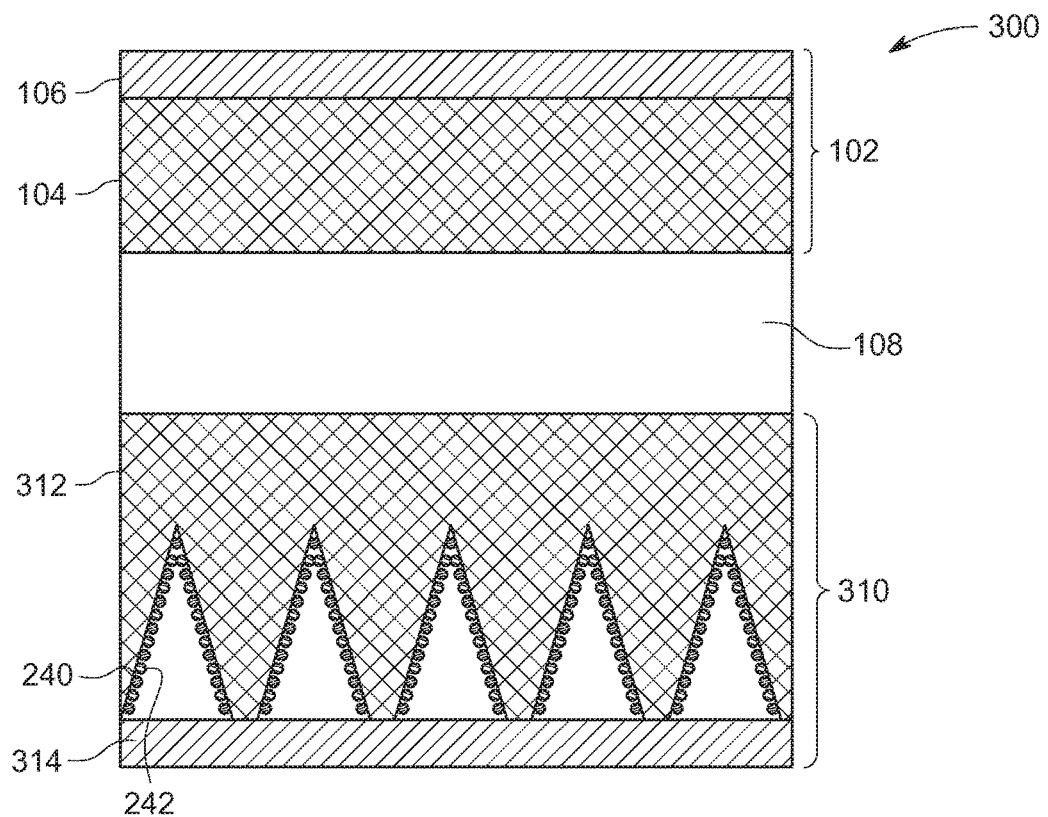
FIG. 4 is a cross-sectional schematic of a unit cell of a solid oxide electrochemical device having another embodiment of the anode layer as disclosed herein.

FIG. 4 illustrates unit cell 300, which has the same structural layers as those in the unit cell 100 in FIG. 2, with aspects of the anode layer 310 as further described. Unit cell 300 includes a cathode layer 102 having a cathode 104 and a cathode current collector 106, an electrolyte layer 108, and an anode layer 310 having an anode 312 and an anode current collector 314. The anode layer 310 is the same as that described with respect to anode layer 110, except the anode 312 includes a first reformer catalyst 240 and a second reformer catalyst 242 different than the first reformer catalyst 240. The first reformer catalyst 240 reforms a different fuel than the second reformer catalyst 242. As a non-limiting example, the first reformer catalyst 240 may be Ni☐BaCe$_{0.7}$Zr$_{0.1}$Y$_{0.2}$O$_{3-\delta}$ to reform methane and the second reformer catalyst 242 may be Ru—Ni—Co/CZ to reform ethanol. In FIG. 4, the first reformer catalyst 240 and the second reformer catalyst 242 are deposited onto the surfaces of the metal support structure 120 that define each channel 130 together, and in equal amounts. One of the first and second reformer catalysts will be active depending on the fuel being fed to the unit cell 300.

Figure 5:
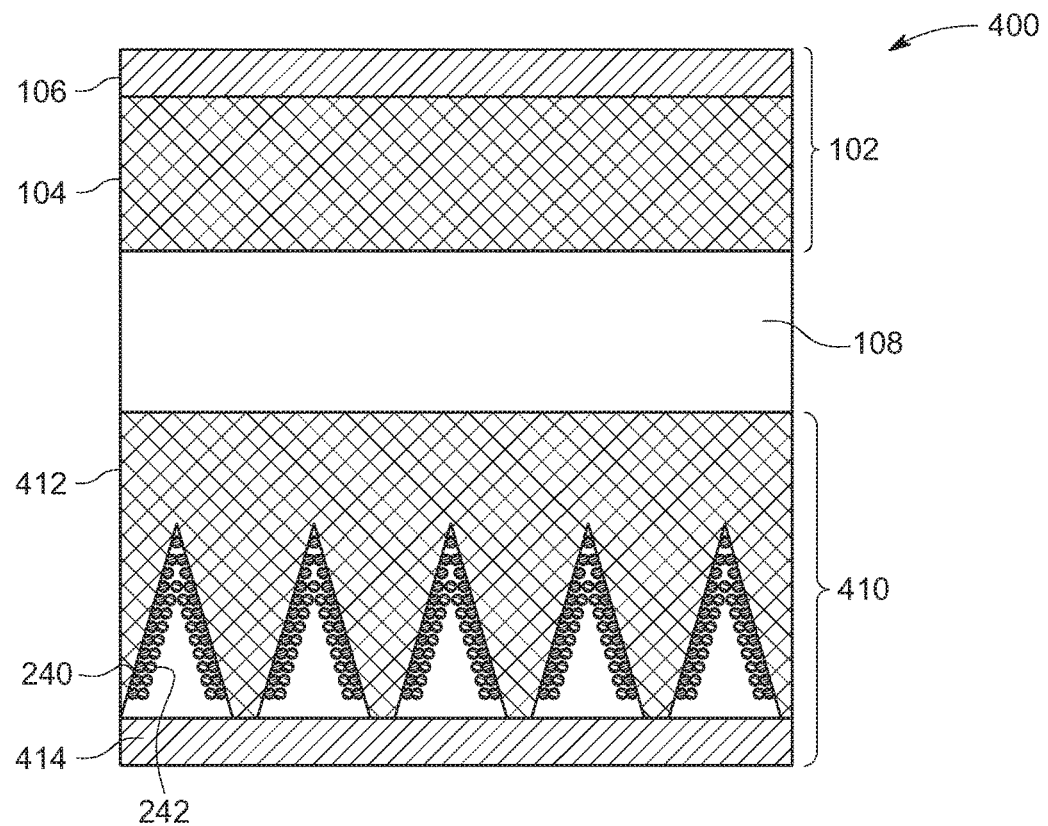
FIG. 5 is a cross-sectional schematic of a unit cell of a solid oxide electrochemical device having yet another embodiment of the anode layer as disclosed herein.

FIG. 5 illustrates unit cell 400, which has the same structural layers as those in the unit cell 100 in FIG. 2, with aspects of the anode layer 410 as further described. Unit cell 400 includes a cathode layer 102 having a cathode 104 and a cathode current collector 106, an electrolyte layer 108, and an anode layer 410 having an anode 412 and an anode current collector 414. The anode layer 410 is the same as that described with respect to anode layer 110, except the anode 412 includes a first reformer catalyst 240 and a second reformer catalyst 242 different than the first reformer catalyst 240. The first reformer catalyst 240 reforms a different fuel than the second reformer catalyst 242. As a non-limiting example, the first reformer catalyst 240 may be Ni☐BaCe$_{0.7}$Zr$_{0.1}$Y$_{0.2}$O$_{3-\delta}$ to reform methane and the second reformer catalyst 242 may be Ru—Ni—Co/CZ to reform ethanol. In FIG. 5, the first reformer catalyst 240 is deposited onto the surfaces of the metal support structure 120 defining each channel 130 and the second reformer catalyst 242 is deposited onto the first reformer catalyst 242.

The embodiments of the anode layers disclosed herein provide functionally graded electrodes in a single electrode concept with little or no increase in ohmic resistance, better gas diffusion, the use of non-conducting catalyst materials, and the ability to easily scale with no external reformer.

The unit cells disclosed herein can be made by methods known to those skilled in the art. As a non-limiting example, the cathode and anode metal supports can be tape cast with the electrolyte and laminated by hot pressing. The layers can undergo binder burnout in air and sintering in a reducing gas. The channels can be formed in the anode metal structure using laser patterning. The anode metal support structure can be infiltrated with the anode catalyst and the cathode metals support structure can be infiltrated with the cathode catalyst. The reformer catalyst can be deposited on the channel surfaces of the anode metal support structure and calcination of the catalyst is performed. Current collectors and interconnects for gas feed and distribution as added.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An anode layer for a solid oxide electrochemical device, the anode layer comprising:
   a metal support structure having an electrolyte-facing surface configured to be in direct contact with an electrolyte layer and a gas distribution-facing surface, the metal support structure defining pores having a pore diameter;
   anode catalyst supported within the pores of the metal support structure;
   channels formed within the gas distribution-facing surface of the metal support structure; and
   a first reformer catalyst deposited onto surfaces of the metal support structure defining the channels, the first reformer catalyst having a diameter greater than the pore diameter.

2. The anode layer of claim 1, further comprising:
   an anode current collector in contact with the metal support structure at each peak of the channels; and
   a reformer catalyst-free portion on each surface of each peak between the anode current collector and the first reformer catalyst.

3. The anode layer of claim 1, wherein the first reformer catalyst is Ru—Ni—Co/CZ.

4. The anode layer of claim 1, wherein the metal support structure is stainless steel.

5. The anode layer of claim 1, wherein the channels have a depth that is between 40% and 70% of a total thickness of the metal support structure.

6. The anode layer of claim 1, wherein the pore diameter of the pores of the metal support structure is less than or equal to 50 nm and the diameter of the first reformer catalyst is greater than 50 nm.

7. The anode layer of claim 1, further comprising a second reformer catalyst, wherein the first reformer catalyst reforms a first fuel and the second reformer catalyst reforms a second fuel.

8. The anode layer of claim 7, wherein the first reformer catalyst is deposited onto one side of the metal support structure defining each channel and the second reformer catalyst is deposited onto an opposite side of the metal support structure defining each channel.

9. The anode layer of claim 7, wherein the first reformer catalyst and the second reformer catalyst are deposited onto surfaces of the metal support structure defining the channels in equal amounts.

10. The anode layer of claim 7, wherein the second reformer catalyst is deposited onto the first reformer catalyst.

11. The anode layer of claim 7, wherein the first reformer catalyst is a catalyst to reform ethanol and the second reformer catalyst is a catalyst to reform methane.

12. A solid oxide electrochemical device, comprising:
an anode layer comprising:
  an anode current collector; and
  an anode comprising:
    a metal support structure having an electrolyte-facing surface and a current collector-facing surface, the metal support structure defining pores having a pore diameter;
    anode catalyst supported within the pores of the metal support structure;
    channels formed within the current collector-facing surface of the metal support structure; and
    a first reformer catalyst deposited onto surfaces of the metal support structure defining the channels, the first reformer catalyst having a diameter greater than the pore diameter;
a cathode layer; and
a solid electrolyte positioned between the anode and the cathode and in direct contact with the metal support structure.

13. The solid oxide electrochemical device of claim 12, wherein the metal support structure is stainless steel.

14. The solid oxide electrochemical device of claim 12, wherein the cathode layer comprises a cathode having a cathode metal support structure and a cathode catalyst supported within the cathode metal support structure.

15. The solid oxide electrochemical device of claim 12, wherein the anode current collector contacts the metal support structure at each peak of the channels, and each peak has a reformer catalyst-free portion on each surface of each peak between the anode current collector and the first reformer catalyst.

16. The solid oxide electrochemical device of claim 12, wherein the first reformer catalyst is Ru—Ni—Co/CZ.

17. The solid oxide electrochemical device of claim 12, wherein the channels have a depth that is between 40% and 70% of a total thickness of the metal support structure.

18. The solid oxide electrochemical device of claim 12, further comprising a second reformer catalyst, wherein the first reformer catalyst reforms a first fuel and the second reformer catalyst reforms a second fuel.

19. The solid oxide electrochemical device of claim 18, wherein the first reformer catalyst is deposited onto one side of the metal support structure defining each channel and the second reformer catalyst is deposited onto an opposite side of the metal support structure defining each channel.

20. The solid oxide electrochemical device of claim 18, wherein the first reformer catalyst is a catalyst to reform ethanol and the second reformer catalyst is a catalyst to reform methane.

* * * * *